United States Patent [19]
Shah

[11] Patent Number: 6,167,259
[45] Date of Patent: Dec. 26, 2000

[54] SYSTEM AND METHOD OF QUANTIFYING THE DEGREE OF BALANCE ON FORWARD LINK AND REVERSE LINK CHANNELS

[75] Inventor: Ali R. Shah, Dallas, Tex.

[73] Assignee: Ericsson Inc., Research Triangle Park, N.C.

[21] Appl. No.: 09/100,278

[22] Filed: Jun. 19, 1998

[51] Int. Cl.[7] .............................. H04B 1/00; H04Q 7/20; H04Q 7/00; H04J 3/16

[52] U.S. Cl. ........................ 455/424; 455/69; 370/329; 370/468

[58] Field of Search ................................... 455/504, 506, 455/63, 65, 67.1, 69, 453, 452, 517, 423, 424, 443, 9, 10; 370/329, 337, 280, 468

[56] References Cited

U.S. PATENT DOCUMENTS

| | | | |
|---|---|---|---|
| 5,257,401 | 10/1993 | Dahlin et al. | 455/33.2 |
| 5,548,812 | 8/1996 | Padovani et al. | 455/33.2 |
| 5,564,075 | 10/1996 | Gourgue | 455/69 |
| 5,774,808 | 6/1998 | Sarkioja et al. | 455/436 |
| 5,802,044 | 9/1998 | Baum et al. | 370/330 |
| 5,960,361 | 9/1999 | Chen | 455/522 |

FOREIGN PATENT DOCUMENTS

| | | |
|---|---|---|
| WO 94/06218 | 3/1994 | European Pat. Off. . |
| WO 97/32444 | 9/1997 | European Pat. Off. . |

OTHER PUBLICATIONS

Michel Mouly et al.; GSM— The System for Mobile Communications; Lassay–Les–Chateaux, Europe Media; pp. 190 and 342–346.

PCT International Search Report dated Dec. 9, 1999.

PCT Partial International Search Report; PCT/US 99/13028; Sep. 16, 1999.

ETSI TC–SMG; European Digital Cellular Telecommunications (Phase ), Radio Subsystem Link Control (GSM 05.08); European Telecommunication Standard; Jul. 1, 1994; pp. 1–5 and 7–35.

*Primary Examiner*—Fan Tsang
*Attorney, Agent, or Firm*—Jenkens & Gilchrist, P.C.

[57] ABSTRACT

A telecommunications system and method is disclosed for analyzing the speech quality, e.g., the Bit Error Rate (BER), on the forward and reverse links to determine whether the links are balanced. For a target cell, the BER on the forward and reverse links can first be measured. The determination of whether the links in the target cell are balanced depends upon whether the BER percentage is known or only the BER class information is available. If the BER percentage is known, the relative difference of the mean BER on the reverse and forward links can be compared to determine the degree of the balance. However, if only the BER class is available, the relative distribution of occurrences of the BER classes on the reverse and forward links can be analyzed to determine whether the links are balanced. The analysis of the path balance can also be used to benchmark speech quality balance in cellular systems.

20 Claims, 5 Drawing Sheets

SYSTEM AND METHOD OF QUANTIFYING THE DEGREE OF BALANCE ON FORWARD LINK AND REVERSE LINK CHANNELS

BACKGROUND OF THE PRESENT INVENTION

1. Field of the Invention

The present invention relates generally to telecommunications systems and methods for maintaining speech quality in a wireless network, and specifically to quantifying the degree of balance, and thus the speech quality, on both the forward and reverse links.

2. Background and Objects of the Present Invention

Cellular telecommunications is one of the fastest growing and most demanding telecommunications applications ever. Today it represents a large and continuously increasing percentage of all new telephone subscriptions around the world. Cellular networks have evolved in two different networks. The European cellular network uses the Global System for Mobile Communication (GSM) digital mobile cellular radio system. In the United States, cellular networks have traditionally been primarily analog, but recent advances have been incorporating digital systems within the analog networks. One such North American cellular network is the D-AMPS network, which is described hereinbelow.

With reference now to FIG. 1 of the drawings, there is illustrated a D-AMPS Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a Mobile Station (MS) 20 may move freely without having to send update location information to the MSC/VLR area 12 that controls the LA 18.

Mobile Station (MS) 20 is the physical equipment, e.g., a car phone or other portable phone, used by mobile subscribers to communicate with the cellular network 10, each other, and users outside the subscribed network, both wireline and wireless. The MS 20 may also include a Subscriber Identity Module (SIM) card 13, or other memory, which provides storage of subscriber related information, such as a subscriber authentication key, temporary network data, and service related data (e.g. language preference).

Each Location Area 12 is divided into a number of cells 22. The MSC 14 is in communication with a Base Station (BS) 24, which is the physical equipment, illustrated for simplicity as a radio tower, that provides radio coverage to the geographical part of the cell 22 for which it is responsible. The radio interface between the BS 24 and the MS 20 utilizes Time Division Multiple Access (TDMA) to transmit information between the BS 24 and the MS 20, with one TDMA frame per carrier frequency. Each frame consists of eight timeslots or physical channels. Depending upon the kind of information sent, different types of logical channels can be mapped onto the physical channels. For example, speech is sent on the logical channel, "Traffic Channel" (TCH), and signaling information is sent on the logical channel, "Control Channel" (CCH).

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If an MS 20 roams into a new MSC/VLR area 12, the VLR 16 connected to that MSC 14 will request data about that MS 20 from the home HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Currently, speech and data are transmitted from the BS 24 to the MS 20 on a forward link channel 30 and from the MS 20 to the BS 24 on a reverse link channel 32. Forward 30 and reverse 32 link speech quality balance is an important issue in mobile communications. An important design criterion in cellular systems 10 is that the quality on both links 30 and 32 should be the same. A perceivable difference in speech quality on the two links 30 and 32 can lead to customer dissatisfaction. Therefore, such an analysis is crucial for noise as well as interference limited systems.

The speech quality in digital cellular systems 10 is measured via quantities such as frame erasure, which is the percentage of TDMA frames that cannot be perceived, and the bit error rate (BER), which is an estimate of the number of coded bits in error. In order to measure the BER, the encoded bits that are transmitted in each burst or frame of data across the forward 30 or reverse 32 link channel are received by a receiver (not shown) and decoded, using, for example, a convolutional decoding algorithm. The algorithm also estimates how many errors were induced by the channel. This estimate of the BER can be referred to as the raw BER. It should be understood that the number of errors estimated by the convolutional decoder is just an estimate of the actual BER. However, this estimate can be considered reliable to a certain degree, and since convolutional codes are usually the most efficient coding mechanisms employed, the BER can be considered as the best estimate of the deterioration in speech quality.

Currently, the BER can be mapped to a particular BER class, which varies for different standards. The corresponding BER percentages for D-AMPS (IS-136) as well as Global System for Mobile Communications (GSM) is shown in Table 1 hereinbelow, for the eight BER classes (0–7).

TABLE 1

| Mapping the Signal Quality to the BER | | |
|---|---|---|
| BER Class | BER (%) for D-AMPS | BER (%) FOR GSM |
| 0 | Below 0.01 | Below 0.2 |
| 1 | 0.01–0.1 | 0.2–0.4 |
| 2 | 0.1–0.5 | 0.4–0.8 |
| 3 | 0.5–1.0 | 0.8–1.6 |
| 4 | 1.0–2.0 | 1.6–3.2 |
| 5 | 2.0–4.0 | 3.2–6.4 |
| 6 | 4.0–8.0 | 6.4–12.8 |
| 7 | Above 8.0 | Above 12.8 |

The raw bit error rate (BER) is quantized above into eight discrete levels or classes. The raw BER and BER class are integral for assessing the speech quality. The advantage of the actual BER percentage is that it is a relatively better metric for evaluating speech quality in comparison to the BER class. Compressing the information into classes results in a loss of information which makes this procedure inappropriate for use because the BER classes are on a non-linear scale. Therefore, the difference between class 1 and 2 may not be perceivable to the user. On the other hand, the difference between class 4 and 5 (2.5% BER vs 7.5% BER) is quite drastic. However, the BER class does give a concise and clear description of the speech quality to the system designer.

The BER on the forward 30 and reverse 32 links needs to be balanced, e.g., substantially equal, in order for both the calling party and the called party to perceive substantially equivalent voice quality. In many instances, the BER is not substantially equal on the forward 30 and reverse 32 links. For example, the BS 24 typically has two receiver antennas, for diversity, and one transmitting antenna. In certain areas of the cell 22, the reception on the forward link 30 can be poor, e.g., the bit error rate (BER) is high, because the transmitting antenna is not suitably located for this area of the cell 22, but, at the same time, the reception on the reverse link 32 can be good, e.g., the BER is low, because at least one of the receiving antennas is located satisfactorily with respect to the same area of the cell 22. Therefore, in order to maintain a system with balance links 30 and 32, the BER on both the forward link 30 and the reverse link 32 must be analyzed at each point in the cell 22.

One such method of analyzing the link balance is the link budget. The link budget allows the computation of the maximum tolerable path loss based upon the transmit power of the BS 24, $P_{BS}$, the receiver sensitivity of the BS 24, $S_{BS}$, the transmit power of the MS 20, $P_{MS}$ the receiver sensitivity of the MS 20, $S_{MS}$, and the diversity gain $G_{div}$. The transmit power for the BS 24 can be obtained from the system vendor, e.g., the performance characteristics of the equipment. The remaining parameters are obtained from the system specification document. In order to insure the same speech quality on both links 30 and 32, the maximum allowable path loss on the reverse link 32 should be the same as the maximum allowable path loss on the forward link 30. The maximum allowable path loss can be computed by taking into account the maximum transmit power and receiver sensitivity of the BS 24 and the MS 20. On the forward link 30, it is:

$$|PL|_{FL}=P_{BS}-L_f+G_{BS}-S_{MS}+G_{MS} \quad [1]$$

Similarly, on the reverse link 32, the maximum path loss that the system 10 can allow is:

$$|PL|_{RL}=P_{MS}+G_{MS}-S_{BS}-G_{div}-L_f+G_{BS}, \quad [2]$$

where $G_{BS}$ and $G_{MS}$ are the antenna gains for the BS 24 and MS 20, respectively. For a balanced system, the path loss is balanced by taking the minimum of the maximum allowable path loss on the forward 30 and reverse 32 links, e.g., $PL=\min(|PL|_{FL}, |PL|_{RL})$. Therefore, the path balance equation after canceling terms is:

$$P_{BS}-S_{MS}=P_{MS}-S_{PS}-G_{div}. \quad [3]$$

What Equation 3 above implies is that the power of the BS 24 has to be adjusted such that $|PL|_{FL}=|PL|_{RL}$, e.g., the path loss on the forward link 30 and the reverse link 32 are substantially the same. It should be noted that the above equation is true only for a noise-limited situation. If interference is dominant in the system, then equation [3] is no longer valid for path balance. Usually the forward link 30 is more prone to interference problems than the reverse link 32 because the BS 24 is transmitting on all timeslots. Therefore, balance speech quality is a key issue for cellular systems 10 and the speech quality balance can change drastically as the interference level fluctuates. Thus, it is important to notice this variation and adaptively update the cell 22 parameters/features, such that the speech quality balance is maintained.

As stated hereinbefore, usually the transmit power of the BS 24 is adjusted to maintain path balance. If the adjustment requires a decrease in the transmit power of the BS 24, that can be done with ease. However, great care is taken before the transmit power is increased, as that can also lead to greater co-channel/multiple access interference for TDMA/CDMA systems. Once the system designer has adjusted these parameters, the goal is to assess if the speech quality is balanced on the forward 30 and reverse 32 links.

The traditional approach for path balance does not take into account the interference levels on both links. One reason is that unlike measuring reverse link interference, it has not been traditionally possible for the system engineer to measure the forward link interference. Hence, the engineer is not able to balance the two links in the appropriate manner. Usually, the engineer utilizes equation [3] above or a similar approach, which assumes that the system noise is limited. However, this approach is suboptimal as it disregards the interference levels on the two links. Furthermore, this existing approach does not enable the engineer to have the ability to statistically analyze the degree of balance on the forward and reverse links.

Another traditional technique of assessing the speech quality balance includes plotting the speech quality on the forward 30 and reverse 32 links as a function of time. However, this type of graph cannot yield meaningful information, because it is the statistics of the speech quality which is of importance to the cellular network designer. This is due to the fact that the forward 30 and reverse 32 links are subject to independent short-term fading because the forward 30 and reverse 32 links are on two separate radio frequencies. As a result, the BER on the two links 30 and 32 is independent as far as the short-term fading is concerned. Therefore, the only accurate way to assess the speech quality balance is to perform a statistical analysis of the information.

Yet another known method of comparing the speech quality on the forward 30 and reverse 32 links is to compare the Cumulative Distribution (CDF) for the forward 30 and reverse 32 link voice quality, as shown in FIG. 2. As can be seen, for the example shown in FIG. 2, the reverse link 32 has a higher proportion of lower BER class measurements, indicating better performance on that link 32, e.g., the system is limited as far as the forward link 30 is concerned. However, the degree of this limitation is not easy to quantify by visual inspection of the CDF. Thus, distinguishing between a balanced and unbalanced system can be tricky. The CDF only gives partial information, and therefore, the degree of the balance is not clear with great statistical confidence.

It is, therefore, an object of the invention to statistically compare the speech quality, e.g., the BER, on the forward and reverse links in order to quantify the degree of balance on the links based upon the statistical significance of the data.

It is a further object of the invention to benchmark the BER balance on the forward and reverse links as a "statistic", which can be used for comparison purposes or in other scenarios, such as when the cellular system is sufficiently loaded and is now interference limited.

It is still a further object of the present invention to develop a methodology to balance an interference limited system.

It is still a further object of the present invention to substantially continuously adjust the power levels on the forward and reverse links in an adaptive manner in accordance with balance measurements to maintain balance on the forward and reverse links.

SUMMARY OF THE INVENTION

The present invention is directed to telecommunications systems and methods for analyzing the speech quality, e.g., the Bit Error Rate (BER), on the forward and reverse links to quantify the degree of balance of the links. The analysis of the link balance can also be used to benchmark speech quality balance in digital cellular systems. Prior to evaluating the link balance in a target cell, the cellular network designer must first adjust the parameters of the target cell and verify whether the paths are balanced, e.g., whether the power of the base station is at a level where the path loss is substantially the same on the forward and reverse links. Thereafter, the BER on the forward and reverse links can be measured. The determination of whether the links in the target cell are balanced depends upon whether the BER percentage is known or only the BER class information is available. Based upon the two types of information, two different approaches can be utilized to assess the speech quality balance in the target cell. If the BER percentage is known, the relative difference of the mean BER on the reverse link channel and forward link channel can be compared to determine the degree of the balance. However, for BER class information, the relative distribution of occurrences of the BER classes on the reverse and forward links can be compared to determine the degree of balance. It should be noted that the BER classes of relevance are those corresponding to a higher BER, e.g., Class 3–7. It is here that the speech quality balance is critical, and therefore, slight differences between the number of occurrences of these Classes on the forward and reverse links carries more weight than slight differences in the lower BER classes.

BRIEF DESCRIPTION OF THE DRAWINGS

The disclosed inventions will be described with reference to the accompanying drawings, which show sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
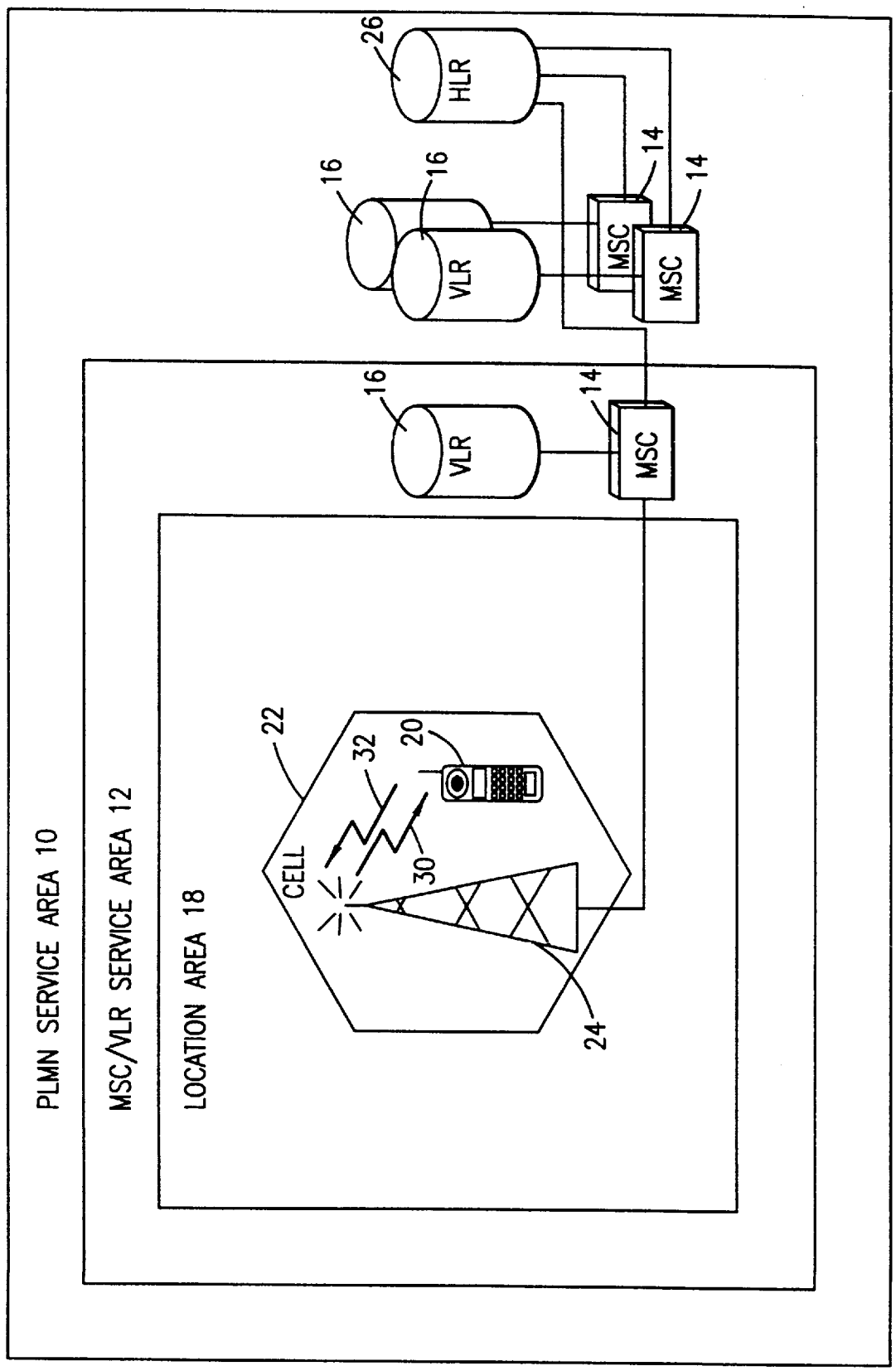
FIG. 1 is a block diagram of a conventional terrestrially-based wireless telecommunications system.
Figure 2:
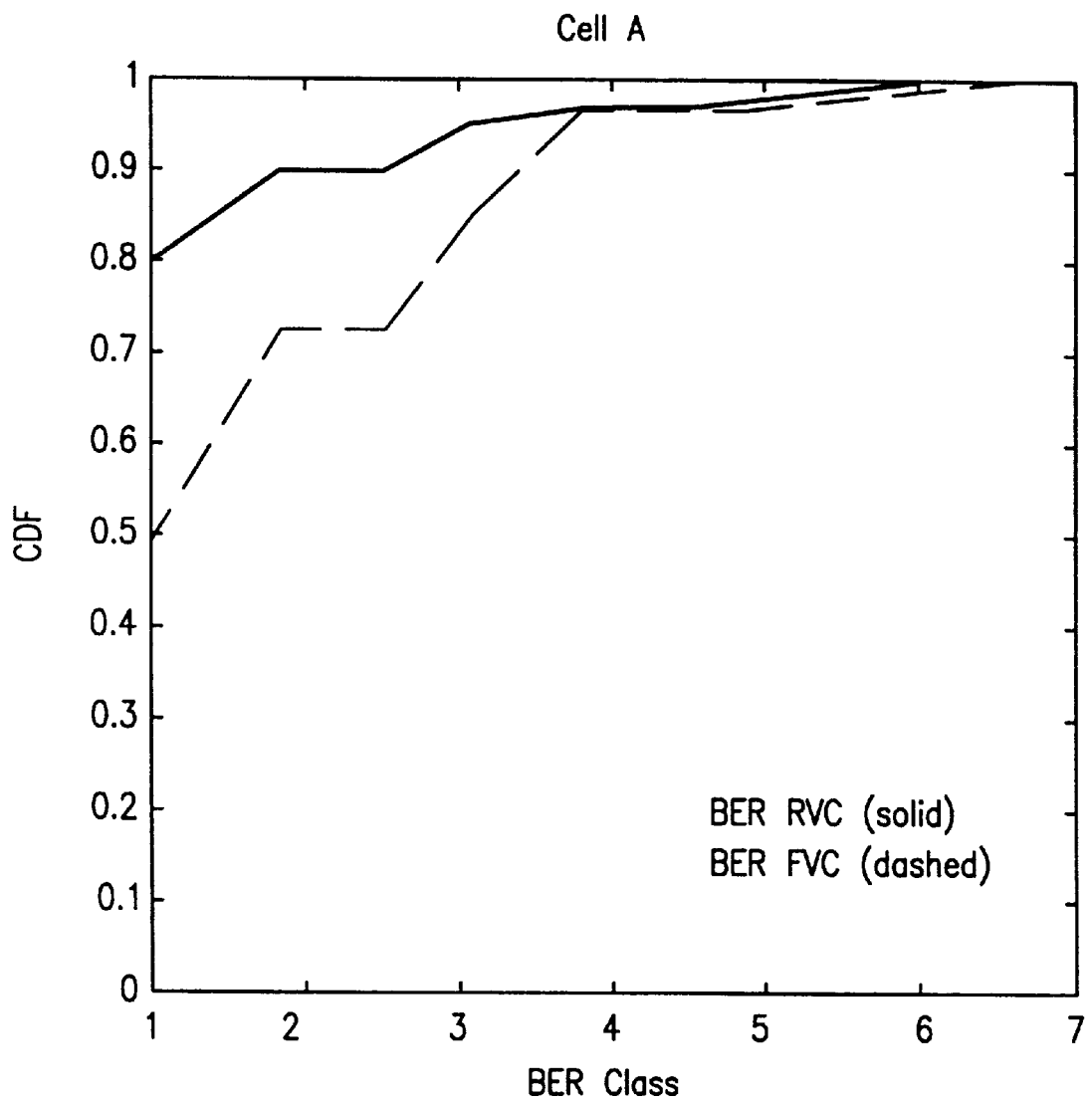
FIG. 2 is a Cumulative Distribution graph illustrating the number of Bit Error Rate (BER) class measurements for each BER class within a cell.
Figure 3:
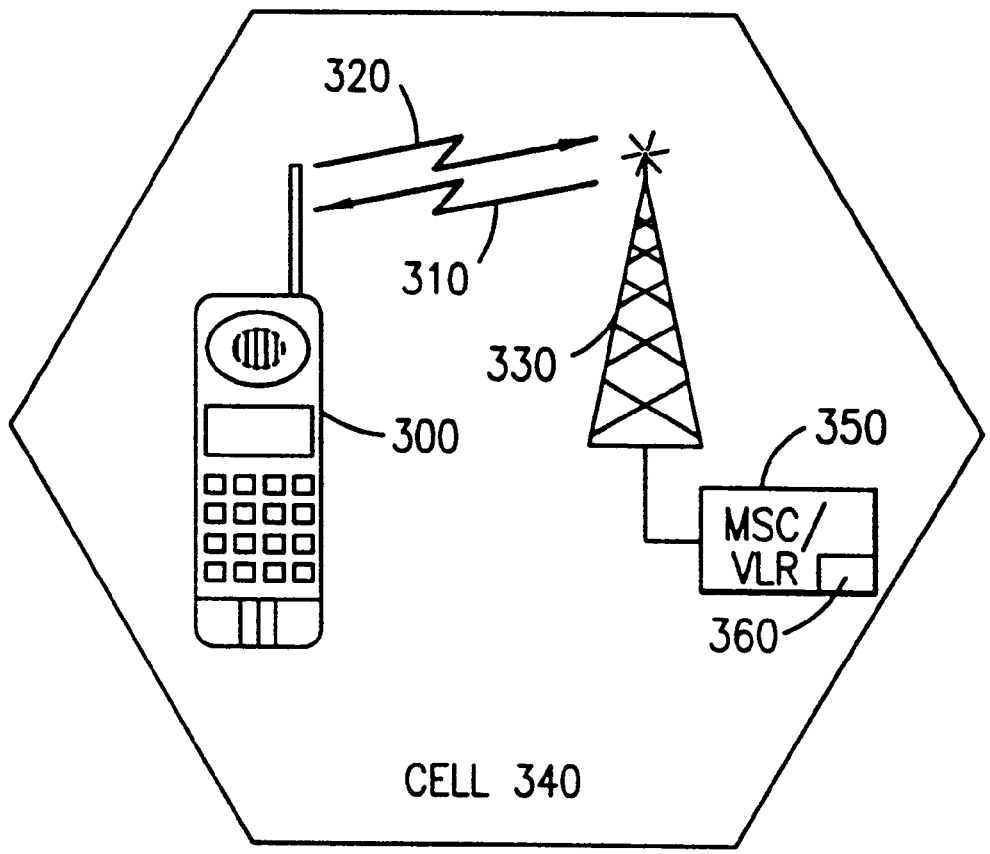
FIG. 3 is a block diagram illustrating the statistical determination of whether forward and reverse links are balanced in accordance with preferred embodiments of the present invention.

With reference now to FIG. 3 of the drawings, in order to quantify the balance of the speech quality on forward 310 and reverse 320 link channels, the speech quality, e.g., the Bit Error Rate (BER), on the forward 310 and reverse 320 links must be analyzed. The objective is not to improve speech quality, but rather to observe the speech quality balance on the forward 310 and reverse 320 links. The speech quality balance can be evaluated in a pyramid fashion, starting with the system level 305, then the cell 340 level followed by the device level. For example, the methodology can be applied to the system level 305 to assess the system level performance, e.g., cells 340 with problems can be identified. Then it can be applied at the cell 340 level to identify problem areas within the cell 340. Finally, devices, e.g., Base Stations (BS) 330, which exhibit faulty characteristics can be checked. In addition to providing a method to remedy problems, the speech quality balance analysis can be used to continually improve performance.

The speech quality balance evaluation methodology itself can be utilized for system tuning and benchmarking purposes. The benchmarking is usually performed when new hardware is added to the system or for initial system start-up. Then continuous tuning occurs in order to improve/maintain performance with an increase in subscriber load.

Figure 4:
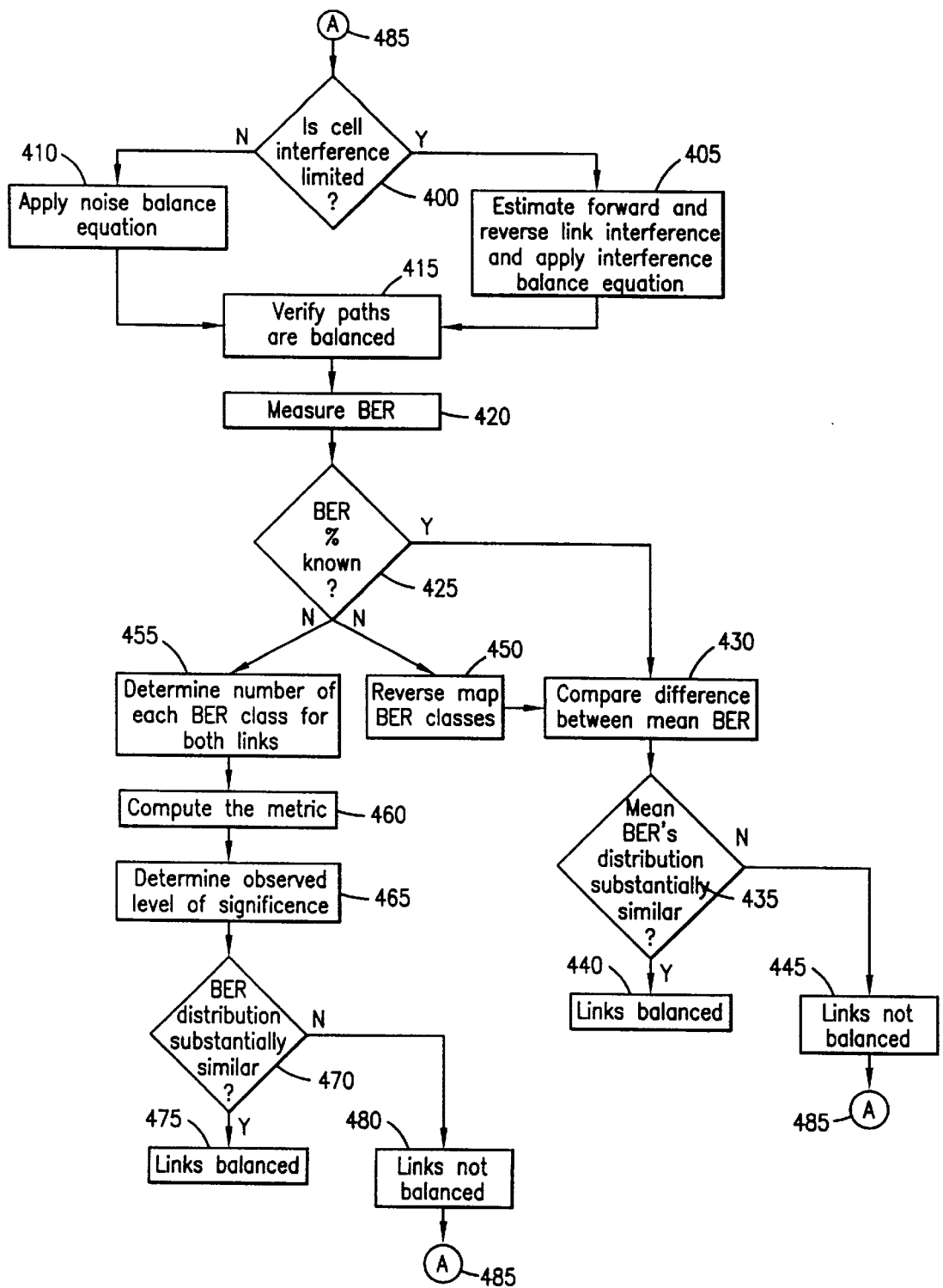
FIG. 4 depicts steps in a sample statistical determination of whether the forward and reverse links are balanced in accordance with preferred embodiments of the present invention.

With reference now to FIG. 4 of the drawings, which will be discussed in connection with FIG. 3 of the drawings, prior to performing a speech quality balance evaluation for a target cell 340 (step 410), the cellular network designer must first adjust the parameters of the BS 330 within the target cell, which depends upon whether or not the cell 340 is interference limited (step 400). It should be understood that the concept of receiver sensitivity is no longer valid in the presence of interference as interference affects the noise floor kTB of the system. In addition, the required signal strength for the BS 330 in the presence of interference $S^i_{BS}$ depends not only upon the theoretical noise floor kTB, but also upon the interference level on the reverse link $IL_{RL}$ and the carrier to interference (C/I) performance ratio. As the power levels for the BS 330 receiver increase (C), the interference levels in neighboring cells also increase (I). Thus, the receiver performance can be characterized by the following equation:

$$S^i_{BS} = kTB + IL_{RL} + C/I \quad [4]$$

It should be noted that the interference level is system specific and can be computed for each cell 340 using a variety of known methods.

Likewise, the receiver performance of the MS 300 for an interference limited system $S^i_{MS}$ is dependent upon both the interference level on the forward link $IL_{FL}$ and the carrier to interference performance characteristics C/I. Thus, the required signal strength in the presence of interference for the MS 300 can be characterized by the following equation:

$$S^i_{MS} = kTB + IL_{FL} + C/I \quad [5]$$

Therefore the path balance equation, which is equation [3] discussed hereinabove, can be calculated for an interference limited system by replacing the receiver sensitivity of the noise limited system $S_{BS}$ and $S_{MS}$ with the receiver performance of an interference limited system $S^i_{BS}$ and $S^i_{MS}$, respectively, which leads to the following equation:

$$P_{BS} - S^i_{BS} = P_{MS} - S^i_{MS}, \quad [6]$$

where $P_{BS}$ is the transmit power of the BS 330 and $P_{MS}$ is the transmit power for the MS 300.

If the cell 340 is interference limited (step 400), the forward and reverse link interferences can be calculated and equation [6] above can be applied (step 405) to verify that the paths are balanced in the cell 340 (step 415), e.g., the power on the forward link 310, which is controlled by the BS 330 within the target cell 340, is at a level such that the path loss on the forward 310 and reverse 320 links is substantially identical. However, if the cell 340 is not interference limited (step 400), equation [3] listed hereinbefore can be applied (step 410) to verify that the paths are balanced in the cell 340 (step 415). The interference levels can change dramatically within short periods of time, and therefore, this process of verifying the path balance (steps 400–415) should be substantially continuously performed.

Thereafter, the BER on the forward 310 and reverse 320 links can be measured in the target cell 340 (step 420). Typically, the BER on the forward link 310 is measured by a technician in the field with a Mobile Station (MS) 300 designed for measuring the BER. Thereafter, the forward link 310 measurements can be forwarded, either via the BS 330 or downloaded directly from the MS 300, to a Mobile Switching Center/Visitor Location Register (MSC/VLR) 350 serving the target cell 340. The BER on the reverse link 320 is typically measured by the BS-330, which then forwards these measurements to the MSC/VLR 350 for comparison with the BER forward link 310 measurements. It should be understood that other techniques for measuring the BER on the forward and reverse links can be utilized. In addition, the BER measurements can be forwarded to another node (not shown) or to the MS 300 itself for comparison purposes.

The degree of balance on the links 310 and 320 can then be quantified by a balance application 360 in the MSC/VLR 350 or other node, using several statistical methods. The statistical method used depends upon whether the BER percentage is known by the MSC/VLR 350 or only BER class information is available to the MSC/VLR 350 (step 425). Based upon the two types of information, two different approaches to assess the speech quality balance can be used. For example, if the BER percentage is known (step 425), the relative difference of the mean BER on the reverse 320 and forward 310 links can be compared (step 430) to determine whether the links 310 and 320 are balanced (step 440). If the mean BER percentage on the reverse link 320 is substantially similar to the mean BER percentage on the forward link 310 (step 435), the links 310 and 320 are balanced (step 440). If, however, the mean BER percentage on the reverse link 320 is not substantially similar to the mean BER percentage on the forward link 310 (step 435), the links 310 and 320 are not balanced (step 445) and the process begins again (step 485). The acceptable amount of difference between the mean BERs on the forward 310 and reverse 320 links can be set by the network provider.

However, in the case that only BER classes are known (step 425), the BER class measurements can be reverse mapped to the median BER percentage in that class (step 450), and then the difference between the median of the mapped BER percentages can be determined (step 430). This can give a rough estimate of the speech quality balance. A sample BER class mapping is shown in Table 2 below.

TABLE 2

Mapping the signal quality to the BER

| BER Class | BER (%) range | median BER (%) |
|---|---|---|
| 0 | Below 0.01 | 0 |
| 1 | 0.01–0.1 | 0.05 |
| 2 | 0.1–0.5 | 0.25 |
| 3 | 0.5–1.0 | 0.75 |
| 4 | 1.0–2.0 | 1.5 |
| 5 | 2.0–4.0 | 3.0 |
| 6 | 4.0–8.0 | 6.0 |
| 7 | Above 8.0 | 10.0 |

As can be seen in Table 2 above, a huge error occurs, especially at BER Class 7, which includes all BER percentages from 8 or 10 percent to 100 percent. Therefore, this method will only give a rough estimate of the balance, as critical information has been lost in the compression. It should be understood that the underlying testing procedure is dependent upon the underlying distribution of the data. If the distribution can be considered normal, then the testing procedure can be utilized to determine whether the links 310 and 320 are balanced. However, if the data is not described adequately by the normal distribution, then non-parametric procedures, such as the sign-rank test, can be utilized, as is understood in the art.

Alternatively, if only the BER class information is available (step 425), another approach, called the goodness of fit test, which depends upon the relative distribution of the number of occurrences of the BER classes on the reverse 320 and forward 310 links, can be utilized (step 455) to quantify the balance of the links 310 and 320 (step 475). The degree of balance of the two links 310 and 320 in the goodness of fit test is related to the metric (step 460) and observed level of significance (step 465) obtained by comparing different BER class ranges. If the BER distribution for each BER class is approximately the same (step 470), then the two links 310 and 320 are approximately balanced (step 475). However, if the distribution is not the same (step 470), then the speech quality is not balanced (step 480) and the process begins again (step 485). The goodness of fit test does not depend upon the underlying distribution of the measurements. Instead, as discussed hereinbefore, the test looks at the number of occurrences of each BER class.

In order to compute the metric for the goodness of fit test (step 460), the number of occurrences of each BER class on the reverse 320 and forward 310 voice channels can be binned into a table such as the one illustrated in Table 3 hereinbelow.

TABLE 3

Computing the metric for the Chisquare Goodness of Fit Test

| Class | 0 | 1 | 2 | 3 | 4 | 5 | 6 | 7 | Total |
|---|---|---|---|---|---|---|---|---|---|
| FL | $N_{f1}$ | $N_{f2}$ | $N_{f3}$ | $N_{f4}$ | $N_{f5}$ | $N_{f6}$ | $N_{f7}$ | $N_{f8}$ | $N_{f.}$ |
| RL | $N_{r1}$ | $N_{r2}$ | $N_{r3}$ | $N_{r4}$ | $N_{r5}$ | $N_{r6}$ | $N_{r7}$ | $N_{r8}$ | $N_{r.}$ |
|  | $N_{.1}$ | $N_{.2}$ | $N_{.3}$ | $N_{.4}$ | $N_{.5}$ | $N_{.6}$ | $N_{.7}$ | $N_{.8}$ | $N$ |

In Table 3 above, $N_{fi}$, $N_{ri}$ are the number of occurrences on the forward 310 and reverse 320 links for BER classes i–1, i–1=0, . . . , 7, and $N_{.i} = N_{fi} + N_{ri}$. In addition, "N" is the total number of occurrences. The goodness of fit test for balance can be performed by computing the metric (step 460) as indicated by the following equation:

$$Q = N \left( \sum_{i=1}^{8} \frac{N_{fi}^2}{N_i N_f} + \sum_{i=1}^{8} \frac{N_{ri}^2}{N_i N_r} - 1 \right) \quad [7]$$

Figure 5:
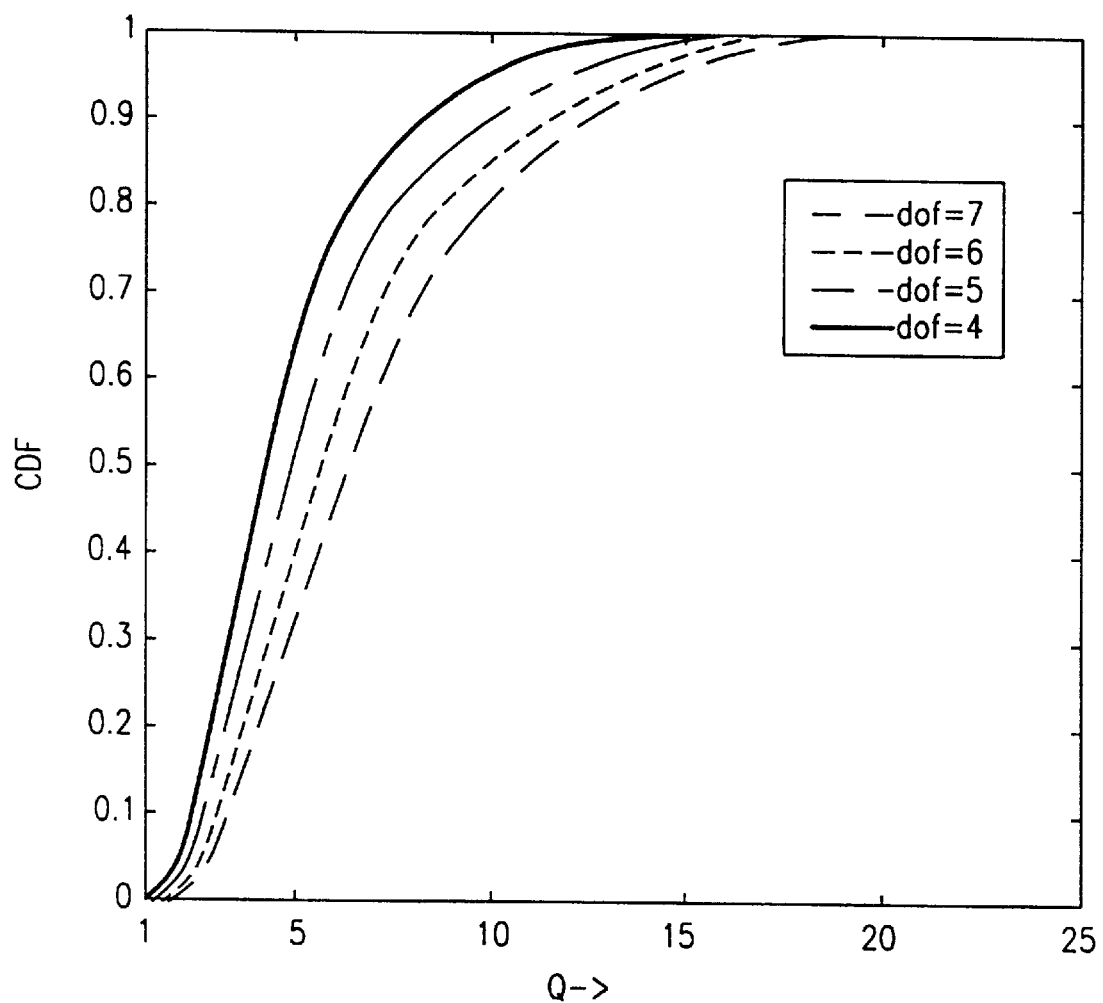
FIG. 5 is a graph illustrating the Cumulative Distribution and metric, which quantifies the balance of the forward and reverse links, for different BER classes.

In Equation 7 above, the degrees of freedom are (8−1)*(2−1)=7. Therefore, the computed metric (step 460) can be compared with the chisquare Cumulative Distribution (CDF), e.g., the probability that Q>0, with 7 degrees of freedom, as shown in FIG. 5 of the drawings. The observed level of significance or the "p-value" can be computed (step 465) from the CDF and is defined as p-value=1−chisquare CDF (step 465). As indicated in FIG. 5, the horizontal axis shows Q for degrees of freedom 4–7 and the vertical axis specifies the CDF. In order to determine whether the links 310 and 320 are balanced (step 475), both the metric (Q) (step 460) and the corresponding observed level of significance (step 465) must be considered. The minimum level of significance required for balanced links 310 and 320 can be defined by the system designer. The lower the required minimum level, the greater the value of Q required to find that the links 310 and 320 are balanced.

It should be noted that the BER classes particularly of relevance are those corresponding to higher BER percentages, e.g., Class 3–7. It is here that the speech quality balance is critical, and therefore, slight differences between the number of occurrences of these Classes on the forward 310 and reverse 320 links carries more weight than slight differences in the number of occurrences of the lower BER classes.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for quantifying the degree of balance of a forward link channel and a reverse link channel within a cell within a cellular network, said telecommunications system comprising:

a base station within said cell, said base station measuring a plurality of bit error rates on said reverse link channel;

measuring means for measuring a plurality of bit error rates on said forward link channel; and quantifying means for quantifying the degree of balance of said forward and reverse link channels based upon said bit error rates on said reverse link channel and said bit error rates on said forward link channel, the degree of balance indicating the degree to which said bit error rates on said forward and reverse link channels are equal.

2. The telecommunications system of claim 1, further comprising a balancing node in communication with said base station, said balancing node receiving said bit error rates on said reverse link from said base station and said bit error rates on said forward link.

3. The telecommunications system of claim 2, wherein said quantifying means are within said balancing node.

4. The telecommunications system of claim 2, wherein said balancing node is a mobile switching center.

5. The telecommunications system of claim 1, further comprising a mobile terminal in wireless communication with said base station, said measuring means being located within said mobile terminal.

6. The telecommunications system of claim 1, wherein the degree of balance of said forward and reverse links is determined by said quantifying means determining a first average of said bit error rates on said forward link and a second average of said bit error rates on said reverse link, said quantifying means determining a value corresponding to the difference between said first average and said second average.

7. The telecommunications system of claim 1, wherein said bit error rates on said forward and reverse links are bit error rate classes.

8. The telecommunications system of claim 7, wherein said quantifying means converts each of said bit error rate classes on said forward and reverse links into median bit error rate percentages, said quantifying means determining a first average of said mean bit error rate percentages on said forward link and a second average of said mean bit error rate percentages on said reverse link, said quantifying means determining a value corresponding to the difference between said first average and said second average, said quantifying means quantifying the degree of balance of said forward and reverse links using said value.

9. The telecommunications system of claim 7, wherein said quantifying means determines the number of each of said bit error rate classes on said forward link and the number of each of said bit error rate classes on said reverse link, said quantifying means computing a metric from the number of each of said bit error rate classes on said forward link and the number of each of said bit error rate classes on said reverse link.

10. The telecommunications system of claim 9, wherein said quantifying means determines a chisquare cumulative distribution based upon the number of each of said bit error rate classes on said forward link and the number of each of said bit error rate classes on said reverse link, said quantifying means calculating an observed level of significance based upon said chisquare cumulative distribution, said quantifying means determining the degree of balance of said forward and reverse links based upon said metric and said observed level of significance.

11. A method for quantifying the degree of balance of a forward link channel and a reverse link channel within a cell within a cellular network, said method comprising the steps of:

measuring, by a base station within said cell, a plurality of bit error rates on said reverse link channel;

measuring a plurality of bit error rates on said forward link channel; and quantifying the degree of balance of said forward and reverse link channels based upon said bit error rates on said reverse link channel and said bit error rates on said forward link channel, the degree of balance indicating the degree to which said bit error rates on said forward and reverse link channels are equal.

12. The method of claim 11, further comprising, before said step of quantifying, the step of:

receiving, by a balancing node in communication with said base station, said bit error rates on said reverse link from said base station and said bit error rates on said forward link.

13. The method of claim 12, wherein said step of quantifying is performed by said balancing node.

14. The method of claim 12, wherein said balancing node is a mobile switching center.

15. The method of claim 11, wherein said step of measuring said bit error rates on said reverse channel is performed by a mobile terminal in wireless communication with said base station.

16. The method of claim 11, wherein said step of quantifying is performed by determining a first average of said bit error rates on said forward link and a second average of said bit error rates on said reverse link, and determining a value corresponding to the difference between said first average and said second average.

17. The method of claim 11, wherein said bit error rates on said forward and reverse links are bit error rate classes.

18. The method of claim 17, wherein said step of quantifying is performed by converting each of said bit error rate classes on said forward and reverse links into median bit error rate percentages, determining a first average of said mean bit error rate percentages on said forward link and a second average of said mean bit error rate percentages on said reverse link, and determining a value corresponding to the difference between said first average and said second average.

19. The method of claim 17, wherein said step of quantifying is performed by determining the number of each of said bit error rate classes on said forward link and the number of each of said bit error rate classes on said reverse link, and computing a metric from the number of each of said bit error rate classes on said forward link and the number of each of said bit error rate classes on said reverse link.

20. The method of claim 19, wherein said step of quantifying is further performed by determining a chisquare cumulative distribution based upon the number of each of said bit error rate classes on said forward link and the number of each of said bit error rate classes on said reverse link, calculating an observed level of significance based upon said chisquare cumulative distribution, said step of quantifying the degree of balance of said forward and reverse links being based upon said metric and said observed level of significance.

* * * * *

UNITED STATES PATENT AND TRADEMARK OFFICE
CERTIFICATE OF CORRECTION

| | | |
|---|---|---|
| PATENT NO. | : 6,167,259 | Page 1 of 2 |
| APPLICATION NO. | : 09/100278 | |
| DATED | : December 26, 2000 | |
| INVENTOR(S) | : Shah et al. | |

It is certified that error appears in the above-identified patent and that said Letters Patent is hereby corrected as shown below:

Please amend the cover page of the patent as follows:

Title Page

Item [56] References Cited: Other Publications: Replace "ETSI TC-SMG; European Digital Cellular Telecommunications (Phase  ), Radio Subsystem Link Control (GSM 05.08); European Telecommunication Standard; Jul. 1, 1994; pp. 1-5 and 7-35." with --ETSI TC-SMG; European Digital Cellular Telecommunications (Phase 2), Radio Subsystem Link Control (GSM 05.08); European Telecommunication Standard; Jul. 1, 1994; pp. 1-5 and 7-35.--

Column 9, lines 38-52     Replace "Claim 1" in its entirety"

With --1.  A telecommunications system for quantifying the degree of balance of a forward link channel and a reverse link channel within a cell within a cellular network, said telecommunications system comprising:
    a base station within said cell, said base station measuring a plurality of bit error rates on said reverse link channel;
    measuring means for measuring a plurality of bit error rates on said forward link channel;
    verifying means for verifying that the path loss on said forward link channel is substantially identical to the path loss on said reverse link channels, said verifying means utilizing the interference level and the carrier to interference performance ratio on said forward and reverse link channels; and
    quantifying means for quantifying the degree of balance of said forward and reverse link channels based upon said bit error rates on said reverse link channel and said bit error rates on said forward link channel.--

Column 10, lines 38-51     Replace "Claim 11" in its entirety

With --11.  A method for quantifying the degree of balance of a forward link channel and a reverse link channel within a cell within a cellular network, said method comprising the steps of:
    verifying that the path loss on said forward link channel is substantially identical to the path loss on said reverse link channel by utilizing the interference level and the carrier to interference performance ratio on said forward and reverse link channels;
    measuring, by a base station within said cell, a plurality of bit error rates on said reverse link channel;

UNITED STATES PATENT AND TRADEMARK OFFICE
CERTIFICATE OF CORRECTION

PATENT NO. : 6,167,259
APPLICATION NO. : 09/100278
DATED : December 26, 2000
INVENTOR(S) : Shah et al.

It is certified that error appears in the above-identified patent and that said Letters Patent is hereby corrected as shown below:

measuring a plurality of bit error rates on said forward link channel; and
quantifying the degree of balance of said forward and reverse link channels based upon said bit error rates on said reverse link channel and said bit error rates on said forward link channel.--

Signed and Sealed this

Twenty-ninth Day of January, 2008

JON W. DUDAS
*Director of the United States Patent and Trademark Office*